Patented May 19, 1936

2,040,973

UNITED STATES PATENT OFFICE 2,040,973

AQUEOUS SOLUTIONS OF THERAPEUTICALLY VALUABLE COMPOUNDS AND A PROCESS OF PREPARING THEM

Louis Benda, Frankfort-on-the-Main, Germany, assignor to Winthrop Chemical Company, Inc., New York, N. Y., a corporation of New York No Drawing. Application May 13, 1933, Serial No. 671,005. In Germany May 14, 1932

12 Claims. (Cl. 167—65)

The present invention relates to aqueous solutions of therapeutically valuable compounds and to a process of preparing them.

I have found that sparingly water-soluble compounds of acridine bases with organic arsonic acids can easily be brought into solution by dissolving them in water in the presence of readily soluble salts of acridine bases. It is thus possible to easily arrive at the desired concentrations necessary for injections and for the local treatment of certain infections. When the readily soluble salt is a salt of a diaminoacridine, the solutions also have the advantage that the therapeutic effect of the diaminoacridines themselves, which have, as is known, a strongly bactericidal action, is combined with the therapeutic effect of the aforesaid sparingly soluble salts which they maintain in solution. Instead of isolating the corresponding salts of arsonic acids with acridine bases and then dissolving them in the said solutions, it is also possible to produce the arsonates and the solution in one operation.

The salts of diaminoacridines with organic arsonic acids used as starting material have been described for instance in the co-pending U. S. application Serial No. 620,538, filed July 1, 1932 in the name of Max Bockmuehl and Alfred Fehrle and in the co-pending U. S. application Serial No. 671,004, filed May 13, 1933 in the name of Louis Benda and Otto Sievers entitled "Compounds of the acridinium series and a process of preparing them". As arsonic acid components there may particularly be used, besides the compounds named in the examples, the following substances:

3-acetylamino-4-hydroxy-5-chlorobenzene-1-arsonic acid,
3-formylamino-4-hydroxybenzene-1-arsonic acid,
3-acetylamino-4-methoxybenzene-1-arsonic acid,
3-acetylamino-4-hydroxyethoxybenzene-1-arsonic acid,
4-benzoylamino-3-hydroxybenzene-1-arsonic acid,
2.4-dihydroxybenzene-1-arsonic acid,
4-acetylamino-2-phenoxyacetic acid-1-arsonic acid,
4-phenylglycineamide-1-arsonic acid, Acetylaminophenyldimethylpyrazolone-arsonic acid of the following formula:

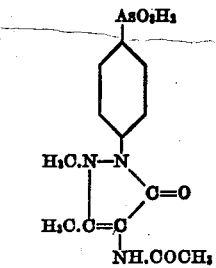

Benzoxazolone-5-arsonic acid,
Benzoxazolone-6-arsonic acid,
3-methylbenzylimidazolone-6-arsonic acid,
2-pyridone-5-arsonic acid,
7-nitro-3-ketobenzisoxazine-6-arsonic acid of the following formula:

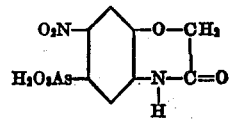

As acridine components which are capable of forming salts with arsonic acids the following compounds may be named:

2.8-dimethoxy-10-methylacridinium chloride,
2-hydroxy-8-methoxy-10-methylacridinium chloride of the following formula:

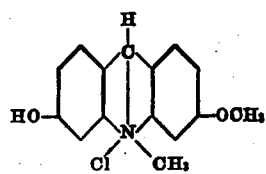

2.8-dihydroxyethoxy-10-hydroxyethylacridinium chloride of the following formula:

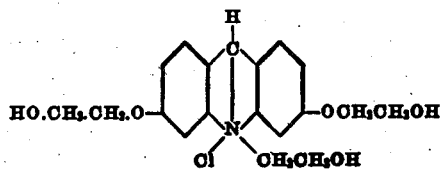

2.8-dimethoxy-10-nitrobenzylacridinium chloride,
2.8-diamino-10-methylacridinium chloride,
2.8-diamino-10-ethylacridinium chloride,
2.8-diamino-10-propylacridinium chloride,
2.8-diamino-10-benzylacridinium chloride,
3.7-dimethyl-2.8-diamino-10-methylacridinium chloride.

The same acridine compounds may be used in the form of their readily soluble salts as addition to the arsonic acid salts of the acridine compounds.

Readily soluble salts of acridine bases are, for instance, the hydrochlorides, hydrobromides, lactates, acetates and nitrates.

The following examples illustrate the invention; the parts are by weight:

(1) The compound obtained by double decomposition of 2.8-diaminoacridine hydrochloride with the sodium salt of paraglycollylaminophenylarsonic acid is soluble in water in the proportion 1:600. A 1.5 per cent. solution of 2.8-diamino-10-methylacridinium chloride, however, dissolves six times this quantity.

(2) In 100 cc. of a one per cent. solution of 2.8-diamino-10-methylacridinium chloride, one gram of the compound resulting from the reaction of 1 molecular proportion of 3-ethoxy-5.8-diaminoacridine lactate with one molecular proportion of sodium para-glycollylaminophenylarsonate is readily dissolved. The said compound is soluble in water only in the proportion of 1:400.

(3) In 100 cc. of 1½ per cent. solution of 3-ethoxy-5.8-diaminoacridine lactate it is possible to dissolve one gram of the compound from the mono-sodium salt of 3-acetylamino-4-hydroxyphenyl-1-arsonic acid with 2.8 diamino-10-methylacridinium chloride, whereas the said compound is soluble in water only in the proportion of 1:400.

(4) From one molecular proportion of 2.8-diamino-10-methylacridinium chloride and one molecular proportion of the sodium salt of para-glycollylaminophenylarsonic acid a compound is obtained which dissolves in 400 parts of water. In a 2 per cent. solution of 3-ethoxy-5.8-diaminoacridine lactate and in a 1½ per cent. solution of 2.8-diamino-10-methylacridinium chloride, however, it dissolves in a proportion of 1:200.

(5) In 100 cc. of water having a temperature of 30° C. there are dissolved 1.75 grams of 2.8-diamino-10-methylacridinium chloride and then 0.5 gram of the sodium salt of para-glycollylaminophenylarsonic acid. In spite of its contents of sodium chloride the solution remains clear.

(6) 150 parts of a 1½ per cent. solution of 2.8-diamino-10-methlyacridinium acetate dissolve one part of the compound from equivalent quantities of 2.8-diamino-10-methylacridinium chloride and sodium para-glycollylaminophenylarsonate.

(7) A one per cent. solution of 2.8-diamino-10-methylacridinium nitrate and also a ½ per cent. solution of the compound from equivalent quantities of 2.8-diamino-10-methylacridinium chloride and sodium para-glycollylaminophenylarsonate are as such not stable, but crystallize on cooling.

On dissolving, however, in 200 parts of a one per cent. solution of 2.8-diamino-10-methylacridinium nitrate one part of the compound from one molecular proportion of sodium para-glycollylaminophenylarsonate and one molecular proportion of 2.8-diamino-10-methylacridinium chloride, a stable solution is obtained.

I claim:
1. The process which comprises dissolving in water a sparingly water-soluble salt of an acridine compound with an organic arsonic acid in the presence of an easily water-soluble salt of an acridine compound.

2. The process which comprises dissolving in water a sparingly water-soluble salt of a diaminoacridine compound with an organic arsonic acid in the presence of an easily water-soluble salt of a diamino-acridine compound.

3. The process which comprises dissolving in water a sparingly water-soluble salt of a compound of the following formula:

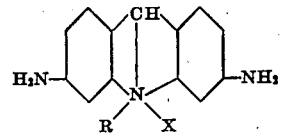

in which R stands for an alkyl group and
X stands for a mineral acid anion or a lower carboxylic acid anion
with an acylaminobenzenearsonic acid in the presence of a compound of the following formula:

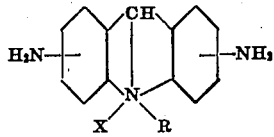

the acridine nucleus of which may be substituted by an ethoxy group and in which
R stands for an alkyl, hydroxyalkyl or aralkyl group and
X stands for a mineral acid anion or a lower carboxylic acid anion.

4. The process which comprises dissolving in water the salt of the following formula:

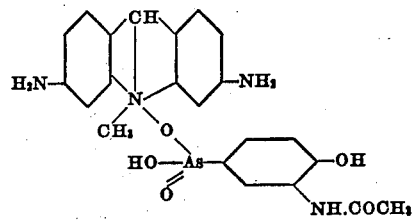

in the presence of 3-ethoxy-5.8-diaminoacridine lactate.

5. The process which comprises dissolving in water the salt of the following formula:

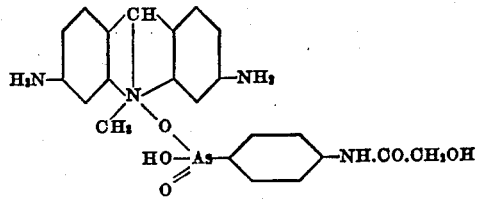

in the presence of 3-ethoxy-5.8-diaminoacridine lactate.

6. The process which comprises dissolving in water the salt of the following formula:

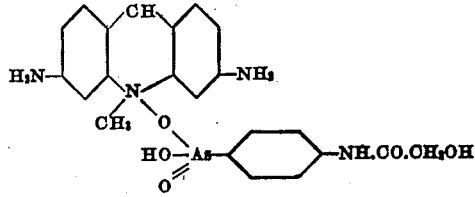

in the presence of 2.8-diamino-10-methylacridinium chloride.

7. Aqueous solutions containing a sparingly water-soluble salt of an acridine compound with an organic arsonic acid and an easily water-soluble salt of an acridine compound.

8. Aqueous solutions containing a sparingly water-soluble salt of a diaminoacridine compound with an organic arsonic acid and an easily water-soluble salt of a diaminoacridine compound.

9. Aqueous solutions containing a sparingly water-soluble salt of a compound of the following formula:

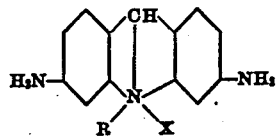

in which R stands for an alkyl group and X stands for a mineral acid anion or a lower carboxylic acid anion with an acylaminobenzenearsonic acid and a compound of the following formula:

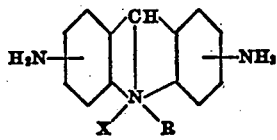

the acridine nucleus of which may be substituted by an ethoxy group and in which R stands for an alkyl group and X stands for a mineral acid anion or a lower carboxylic acid anion.

10. Aqueous solutions containing the salt of the formula:

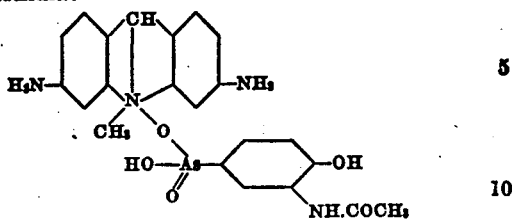

and 3-ethoxy-5.8-diaminoacridine lactate.

11. Aqueous solutions containing the salt of the formula:

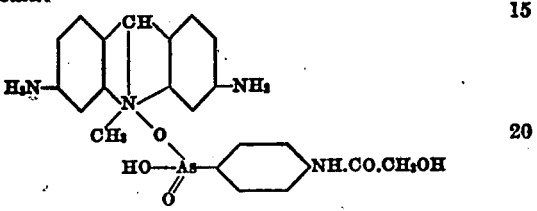

and 3-ethoxy-5.8-diaminoacridine lactate.

12. Aqueous solutions containing the salt of the formula:

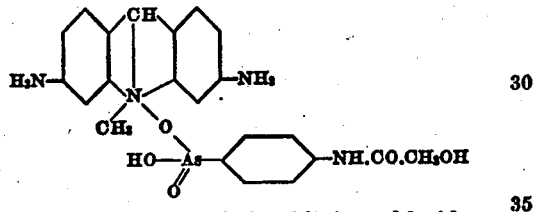

and 2.8-diamino-10-methylacridinium chloride.

LOUIS BENDA.